M. A. WERTMAN.
MACHINE TOOL.
APPLICATION FILED APR. 15, 1918.
1,308,152.
Patented July 1, 1919.
2 SHEETS—SHEET 2
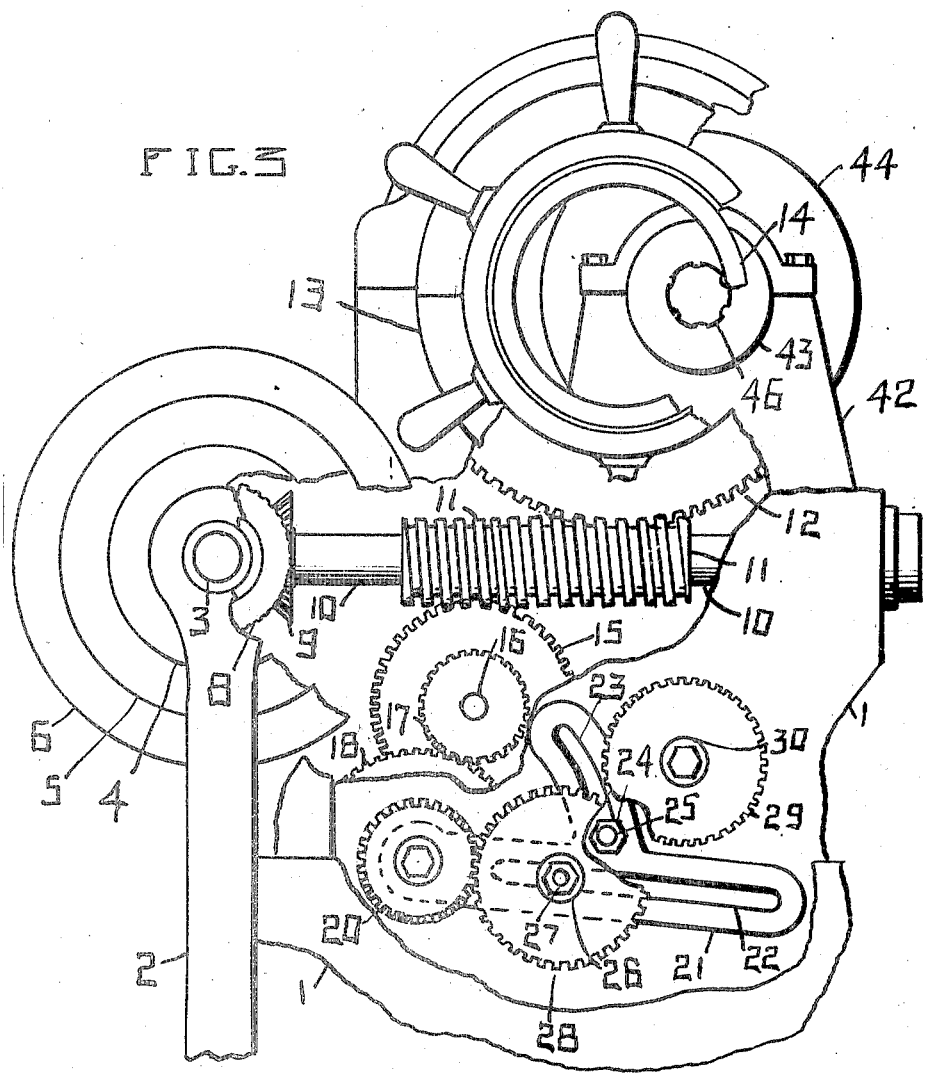
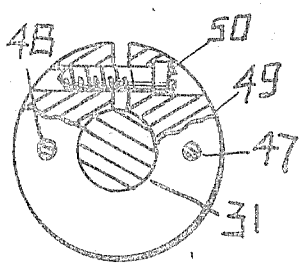
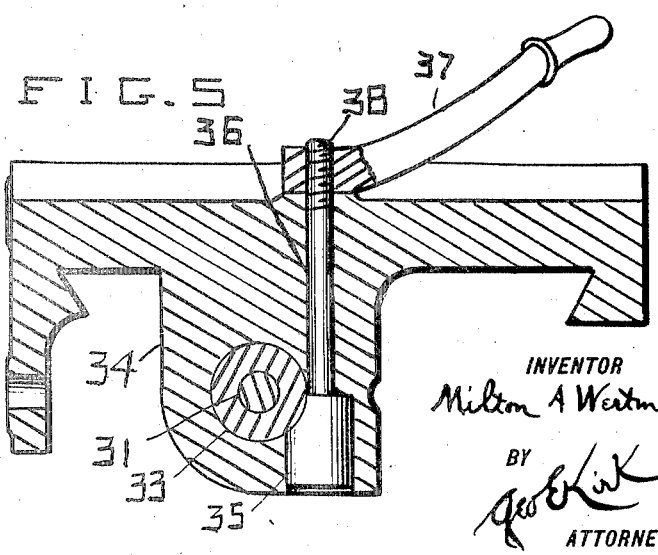
INVENTOR
Milton A Wertman
BY
Geo E Kirk
ATTORNEY

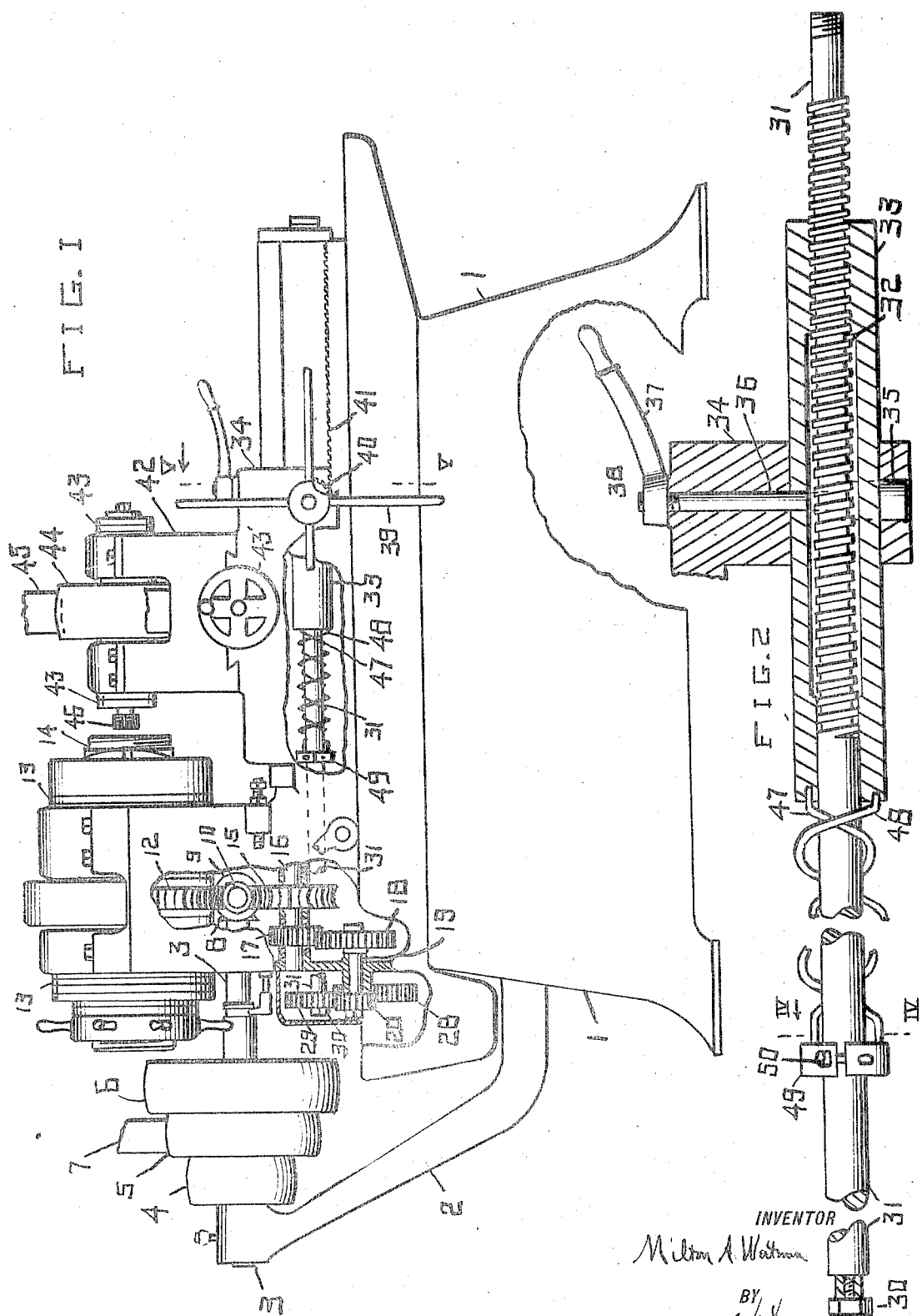

UNITED STATES PATENT OFFICE.

MILTON A. WERTMAN, OF TOLEDO, OHIO, ASSIGNOR TO THE BIGGS-WATTERSON CO., OF CLEVELAND, OHIO, A CORPORATION OF OHIO.

MACHINE-TOOL.

1,308,152.   Specification of Letters Patent.   Patented July 1, 1919.

Application filed April 15, 1918. Serial No. 228,813.

*To all whom it may concern:*

Be it known that I, MILTON A. WERTMAN, a citizen of the United States of America, residing at Toledo, Lucas county, Ohio, have invented new and useful Machine-Tools, of which the following is a specification.

This invention relates to drive and recover devices in the handling of relatively rotatable or movable members, as in machine tools.

This invention has utility when incorporated in connection with a pair of opposing rotatable work and tool members, one of which may be fed as to the other.

Referring to the drawings:

Figure 1 is a side elevation of an embodiment of the invention in a fixed horizontal axis spindle machine tool;

Fig. 2 is a fragmentary view of the feed screw with the reset features therefor, the screw and bolt being in elevation, and the nut and bolt mounting in relatively offset sections;

Fig. 3 is a fragmentary end elevation of the machine of Fig. 1, showing the gear trains;

Fig. 4 is a section on the line IV—IV, Fig. 2, as to the shaft and springs, the collar being partially broken away; and Fig. 5 is a section on the line V—V, Fig. 1.

The machine frame 1 carries the bracket 2 for the shaft 3, upon which is mounted the variable speed cone comprising the pulleys 4, 5, 6, to be actuated by the driving belt 7. This shaft 3 carries the bevel pinion 8 in mesh with the bevel pinion 9 on the main drive or worm shaft 10.

The worm shaft 10 has a thread carrying or worm portion 11 in mesh with the worm wheel 12 for rotating the hollow spindle 13 and the work 14 at a slow speed. As this spindle 13 is open throughout its extent, and the structure of the machine tool is clear of the axis of this spindle extended, this machine is readily operable in handling work of indefinite length.

Below the main drive shaft 10 and in mesh with the worm portion 11 thereon is the worm wheel 15 of the feed drive. The rotation or work driving gear train is shown as having its coacting section operating upon a different portion of the worm from the feed drive. However, in this instance the worm portion is shown as continuous.

The worm wheel 15 is mounted on the shaft 16 for driving the gear 17 in mesh with the gear 18, on the shaft 19 protruding through the end of the machine tool frame 1 to carry the gear 20. The shaft 16 is a rotatable connecting means between the coaxial gear 17 and worm wheel gear 15. The shaft 19 is a rotatable driving connecting means between the coaxial gears 18, 20. Mounted on the shaft 19, or rather, coaxial therewith, is the arm 21 having the radial guide 22 and the arc guide 23. The nut 24 on the stem 25 protruding through the guide 23, serves to fix the position of the arm 21 in its swing, while the nut 26 coacting with the pin 27 loosely slidable along the guide 22, serves to fix the position of this pin 27 for carrying the gear wheel 28 in mesh with the gear 20, as well as in mesh with gear wheel 29 detachably mounted by bolt 30 on the rotatable feed actuating member or screw 31. The gears 20, 28, 29 are in a common plane, parallel to the plane of the gears 17, 18, also in a plane. The gears 20, 28, 29, are removable for the introduction of other gears or interchange among these gears, to vary the speed of rotation of the member 31 as to the spindle 13. The arm 21 permits swinging of the intermediate gear of this three gear train into proper mesh with the pair of outer gears. The range of changes accordingly is such as can respond to any desired work.

The screw 31 has threaded portion 32 with which the element or nut 33 has threaded coaction. This element 33 extends through the carriage 34. Clamping means is provided for releasably connecting the nut 33 to the carriage 34 comprising the friction block 35, the actuating stem 36 upwardly extending therefrom, and the handle 37 swingable upon the threaded end 38 of the stem 36 for drawing the block 35 into locking or carriage holding position. A slight swing of the handle 37 in the reverse direction releases the carriage 34, so the hand wheel 39 may operate the gear 40 on the rack 41 for shifting the carriage as desired.

The carriage 34 is provided with guides for the bearing 42 carrying the tool spindle 43 rotated from pulley 44 by means of the belt 45. The rotatable tool 46 is shown as a milling cutter for internal thread cutting by one rotation of the work spindle 13 for the full length of thread to be formed. Accordingly the tool extent with its interrupted peripheral ribs corresponds to the number of threads depth. The cross section of a rib should be of the contour of the thread. The feed of the carriage 34 determines the pitch.

Accordingly in practice, the carriage 34, in completing a single operation has but a very small travel—one pitch advance. By the handle 37, the carriage is released, and by the hand wheel 39 the tool 46, is longitudinally positioned as to the work—any lateral setting being by means of the hand wheel 43'. The spindle 43 accordingly may be placed in various positions as to the axis of the spindle 13, as well as along such axis. However, the carriage 34 may dispose the screw 31 a little to one side of the vertical plane through the axis of the spindle 13. Accordingly the average position for the working load is near the vertical plane through the axis of the screw 31.

The positioning of the carriage 34 as to the work involving the release of the friction block 35, permits an automatic resetting of the nut 33 on the feed screw 31, for resetting means is provided in the helical springs 47, 48, extending to the clamping collar 49 fast on the screw 31. The springs 47, 48 are oppositely pitched, one within the other, the design being such that their torsional tendency at neutral position is approximately equal each way therefrom. The springs may be of such extent to permit more than one feed rotation. Further, in their provision of two direction resetting action, the feed may be for either a right hand pitch or a left hand pitch, when threads are being cut. The split collar 49 may be of fiber with its friction adjusted by the screw 50, so that holding may be assured for normal operation, but any excessive twisting may not cause a break down. When block 35 is released, the nut 33 returns to neutral starting position. While the nut 33 is thus automatically reset, the operator positions the released carriage 34 by the hand wheel 39 before connecting up to the drive by shifting the handle 37. With carriage 34 adjusted, the swinging of the handle 37 to bring the block 35 back to holding position, clamps the carriage 34 to the automatically reset nut 33.

The single or one gear pair speed reduction for the rotation of the spindle 13, herein described as the work spindle, is most simple. The feed train therefrom is clear from any interference with tool or work holding spindles, or extensions therefrom, and is direct by a worm speed reduction with one offset, thus making two pairs of gears inside the machine frame and thence to the feed screw 31 by the speed change gears disposed in a single plane exteriorly of the frame. The feed drive may be for more than one rotation with continued progress of the feed or travel in the same direction.

What is claimed and it is desired to secure by Letters Patent is:

1. A machine tool including a feed screw, a holder operable thereby, a nut having thread mounting on the screw, means for clamping the nut to the holder, and a two direction operable reset means for positioning the nut on the screw upon release of the clamping means.

2. A machine tool including a drive embodying a rotatable member, a holder, an element mounted on the member to be moved thereby, means for clamping the element to the holder to move the holder, and spring means automatically operable upon release of the clamping means for resetting the element.

3. A machine tool including a drive embodying a rotatable member, a holder, an element mounted on the member to be moved thereby, means for clamping the element to the holder to move the holder, and oppositely wound helical springs automatically operable upon release of the clamping means for resetting the element.

4. A machine tool including a frame, a rotatable feed actuating member mounted therein, a carriage movable on the frame by the member, an element mounted on the member for driving coaction therewith, means for clamping the element to the carriage, and an automatic reset means coacting between the member and element for effecting shifting therebetween when the element is unclamped from the carriage.

5. A machine tool including a frame, a feed drive for effecting continued feed travel during a plurality of rotations, said drive having a worm wheel gear mounted in said frame, a worm also mounted in the frame for driving the worm wheel gear, a pair of gears in a plane parallel to the worm wheel gear and disposed in said frame, a feed actuating member, exterior of the frame speed varying changeable gears in a second plane for driving the feed actuating member, a gear from each of said planes being coaxial and rotatable connecting means between the two pairs of gears.

In witness whereof I affix my signature.

MILTON A. WERTMAN.